United States Patent [19]

Marten et al.

[11] Patent Number: 4,946,658

[45] Date of Patent: Aug. 7, 1990

[54] ADDITION OF PYRITIC MATERIALS TO FEED MIX FOR DESULFURIZATION OF PHOSPHOGYPSUM

[75] Inventors: Jerome H. Marten; George M. Lloyd, Jr., both of Lakeland, Fla.

[73] Assignee: Florida Institute of Phosphate Research, Bartow, Fla.

[21] Appl. No.: 351,269

[22] Filed: May 11, 1989

Related U.S. Application Data

[63] Continuation of Ser. No. 188,700, May 4, 1988, abandoned, which is a continuation of Ser. No. 927,439, Nov. 6, 1986, abandoned.

[51] Int. Cl.$^5$ .............................................. C01F 11/46
[52] U.S. Cl. .................................... 423/168; 423/171; 423/178; 423/539; 423/555; 423/542; 201/12; 201/16; 201/17; 44/622
[58] Field of Search ............... 423/539, 555, 171, 172, 423/168, 178, 542, 638, 541 R; 48/197 R, 210; 201/12, 16, 20, 25; 106/109, 117; 44/15 R, 10 R, 622

[56] References Cited

U.S. PATENT DOCUMENTS

| | | | |
|---|---|---|---|
| 1,069,191 | 8/1913 | Von Schlippenbach | 423/542 |
| 1,801,741 | 4/1931 | Hasselbach | 106/103 |
| 1,824,351 | 9/1931 | Hunt | 423/555 |
| 2,086,733 | 7/1937 | Muilez | 23/177 |
| 2,263,766 | 11/1941 | Fentress et al. | 23/177 |
| 2,391,328 | 12/1945 | Mohr | 23/178 |
| 2,426,147 | 8/1947 | Horn | 106/103 |
| 2,789,034 | 4/1957 | Swaine et al. | 423/542 |
| 3,042,498 | 7/1962 | Norman | 423/542 |
| 3,087,790 | 4/1963 | Wheelock et al. | 23/186 |
| 3,169,269 | 2/1965 | McDowell et al. | 18/1 |
| 3,195,981 | 7/1965 | Hansford et al. | 23/177 |
| 3,235,330 | 2/1966 | Lapple | 423/322 |
| 3,260,035 | 7/1966 | Wheelock et al. | 55/73 |
| 3,302,936 | 2/1967 | Ban | 263/23 |
| 3,325,395 | 6/1967 | Ban | 208/9 |
| 3,582,276 | 6/1971 | Campbell et al. | 23/177 |
| 3,595,610 | 7/1971 | Brinkman et al. | 23/107 |
| 3,607,045 | 9/1971 | Wheelock et al. | 23/186 |
| 3,607,068 | 9/1971 | Campbell et al. | 23/224 |
| 3,729,551 | 4/1973 | Gorin | 423/638 |
| 3,956,456 | 5/1976 | Keller et al. | 423/171 |
| 3,986,819 | 10/1976 | Heian | 423/14 |
| 4,014,682 | 3/1977 | Majewski | 423/322 |
| 4,017,272 | 4/1977 | Anwer et al. | 423/244 |
| 4,102,989 | 7/1978 | Wheelock | 425/541 |
| 4,111,755 | 9/1978 | Ban et al. | 201/6 |
| 4,120,934 | 10/1978 | Mioen | 423/18 |
| 4,144,312 | 3/1979 | Lupis | 423/178 |
| 4,162,170 | 7/1979 | Grancharov et al. | 106/109 |
| 4,176,157 | 11/1979 | George et al. | 422/114 |
| 4,200,454 | 9/1980 | Ban et al. | 48/202 |
| 4,200,517 | 4/1980 | Chalmers et al. | 208/11 R |
| 4,247,518 | 1/1981 | Charlet et al. | 422/142 |
| 4,299,634 | 11/1981 | Hutter et al. | 106/103 |
| 4,312,842 | 1/1982 | Wilson, Sr. et al. | 423/178 |
| 4,415,543 | 11/1983 | Wilson, Sr. et al. | 423/178 |
| 4,503,018 | 3/1985 | Gardner et al. | 423/168 |
| 4,744,969 | 5/1988 | Marten et al. | 423/168 |

FOREIGN PATENT DOCUMENTS

| | | | |
|---|---|---|---|
| 248760 | 1/1964 | Australia | 423/168 |
| P1913244.6 | 9/1970 | Fed. Rep. of Germany | 106/103 |
| 2724126 | 12/1977 | Fed. Rep. of Germany | 106/110 |
| 682467 | 9/1979 | U.S.S.R. | 106/103 |
| 775051 | 10/1980 | U.S.S.R. | 423/638 |
| 694035 | 7/1953 | United Kingdom | 423/638 |

Primary Examiner—Anthony McFarlane
Attorney, Agent, or Firm—Bernard, Rothwell & Brown

[57] ABSTRACT

A pelletized mixture of gypsum, carbonaceous material and pyrite is charged to a travelling grate where the charge is heated under suitable conditions to produce a solid sintered material which has a broad spectrum of applications due to its chemical and physical properties and a gaseous effluent containing sulfur dioxide, sulfur or mixtures thereof.

12 Claims, 2 Drawing Sheets

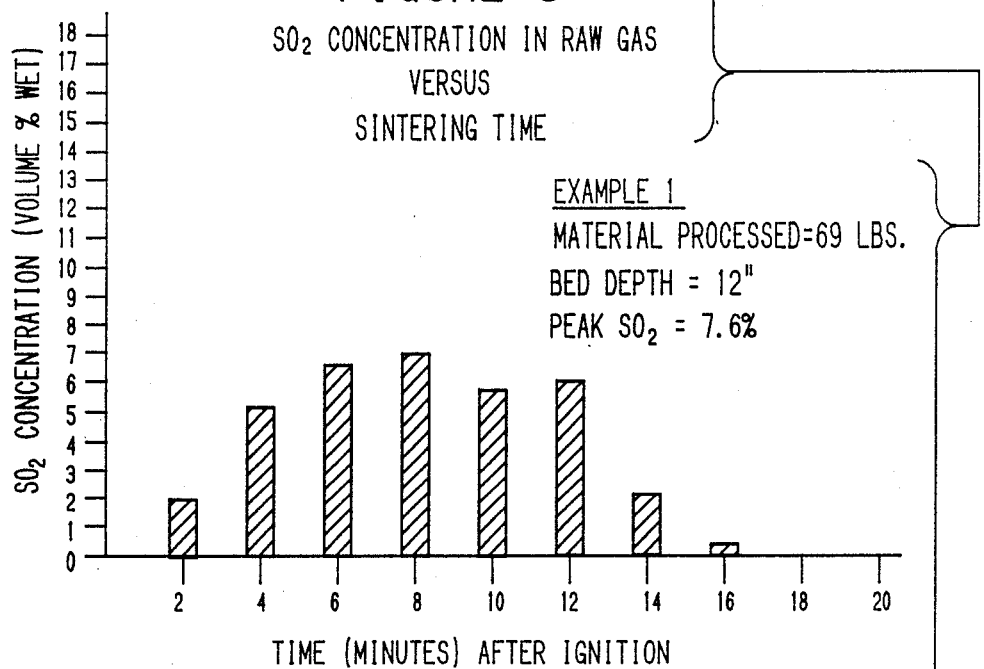
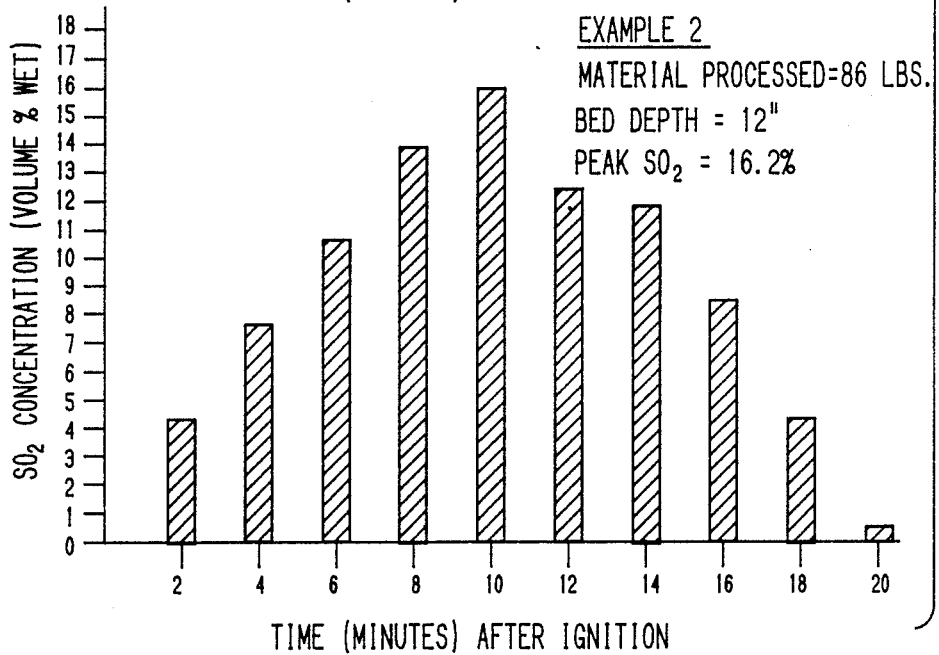

ADDITION OF PYRITIC MATERIALS TO FEED MIX FOR DESULFURIZATION OF PHOSPHOGYPSUM

This is a continuation of application Ser. No. 07/188,700, filed May 4, 1988, now abandoned, which in turn is a continuation of application Ser. No. 06/927,439, filed Nov. 6, 1986 now abandoned.

BACKGROUND OF THE INVENTION

The present invention relates to a process for the desulfurization of gypsum such as natural or by-product phosphogypsum. The present process provides for the coproduction of a solid sintered material and a gaseous effluent containing sulfur dioxide, sulfur or mixtures thereof.

Natural phosphate rock is the primary commercial source of phosphorous. One of the most common methods of producing phosphoric acid from the phosphate rock is the acid or wet process. The wet process comprises digesting the phosphate rock with a strong mineral acid, e.g., sulfuric acid, to release phosphoric acid. The solid residue of the wet process is impure calcium sulfate or phosphogypsum. Phosphogypsum has, until recently, been considered a waste product of the wet process having no commercial value and thus great mounds of phosphogypsum have accumulated near and around phosphoric acid plants. These mounds of phosphogypsum pose an environmental problem due to the acidulation of rainwater runoff from the soluble compounds in the phosphogypsum.

One commercially valuable process which converts phosphogypsum into useful products is disclosed in U.S. Pat. No. 4,503,018 issued to Gardner et al. (Gardner) which is incorporated by reference in its entirety. The Gardner process produces sulfur and/or sulfur dioxide from gypsum by thermal decomposition of the gypsum. More specifically, Gardner pelletizes a mixture of fine coal and fine gypsum material and charges the pellets to a travelling grate where the pellets are heated under suitable conditions to produce a gaseous effluent containing sulfur dioxide and/or sulfur. After the pellets have undergone the thermal decomposition, the lime residue may be sold or used in conventional applications. Gardner teaches that other carbonaceous material or reducing materials such as coke, petroleum coke, elemental sulfur, pyrite and other sulfides may be used in place of coal.

While the Gardner process is a viable method of converting phosphogypsum into usable products, those skilled in the art are continuously striving to find methods of improving the efficiency of the Gardner process and provide a more economical means of utilizing the phosphogypsum. Surprisingly, the present inventors have discovered that use of the combination of carbonaceous material and pyrite as a feed mix provides significant and unexpected advantages over use of coal or pyrite alone.

SUMMARY OF THE INVENTION

The present invention relates to an improvement to the Gardner process by supplementing the pelletized mixture with a pyritic material or its equivalent in terms of Fe or S content. By using a pyritic material and carbonaceous material in the pelletized mixture, a sintered product is produced having improved chemical and physical properties, the sulfur content of the gaseous effluent is increased, the overall sulfur removal efficiency of the process is increased and the consumption of expensive carbonaceous fuel is reduced.

BRIEF DESCRIPTION OF THE DRAWINGS

FIG. 3 is graph showing the $SO_2$ concentration versus sintering time for Examples 1 and 2.

DESCRIPTION OF THE PREFERRED EMBODIMENTS

Figure 1:
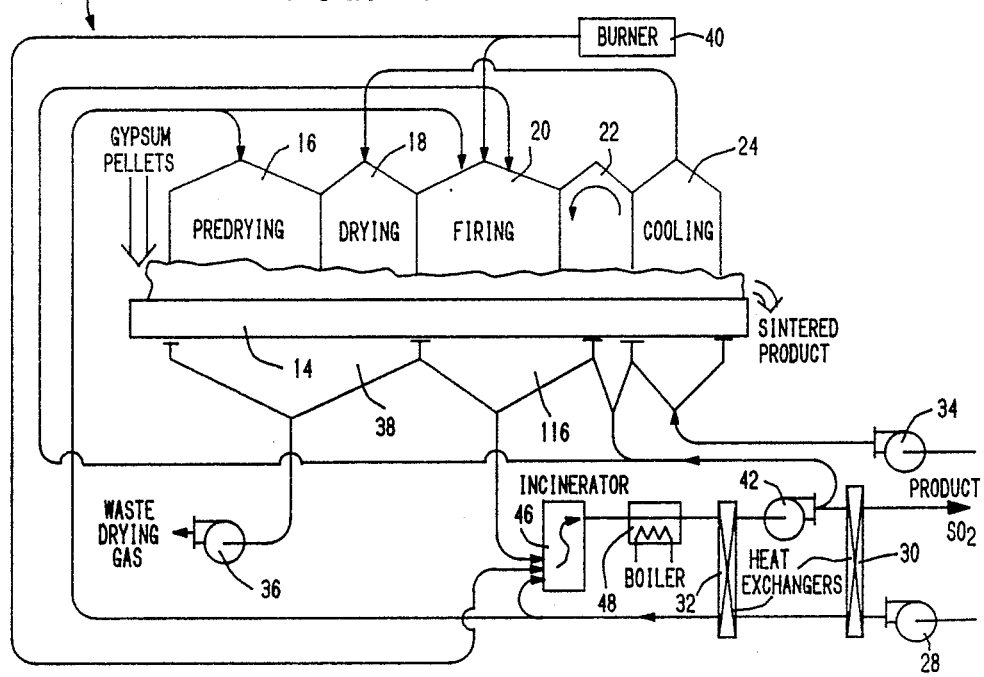
FIG. 1 is a diagramatic section view of a travelling grate suitable for use in the present invention.

The present invention utilizes the proven travelling grate reactor to thermally decompose phosphogypsum into usable by-products. The process incorporates pyritic materials with a mixture of phosphogypsum, solid carbonaceous material, and optionally a number of other additives. The mixture is balled into pellet form suitable for processing on a travelling grate. The pellets are charged onto the travelling grate which carries the pellets through a series of zones including firing and post firing zones. In the firing zone, the pellets are heated under suitable reaction conditions such that a gaseous effluent is produced containing sulfur dioxide, sulfur or mixtures thereof. The gaseous effluent or portions thereof is preferably passed through the charge as the charge passes through the post firing zone and is thereafter collected for use as the feed gas for a conventional metallurgical-type sulfuric acid plant. The sintered, solid by-product, which remains on the grate after the reaction, is discharged in a dry form from the grate.

By the supplemental addition of pyritic materials to the mixture of phosphogypsum and carbonaceous materials, significant improvements are achieved over the Gardner process. Firstly, the solid sintered co-product has improved physical and chemical characteristics over lime and has use in a number of applications including skid-resistent road surfaces, road bases, soil cement and consolidation of phosphatic clays. Secondly, use of the pyritic material improves the sulfur content of the gaseous effluent, i.e., sulfur dioxide gas strength, from the travelling grate reactor. Thirdly, the sulfur removal efficiency of the overall travelling grate process is increased as there is a catalytic effect due to the addition of the pyritic materials. Fourthly, the consumption of expensive carbonaceous fuel is reduced by permitting cheaper forms of high sulfur fuel to be used which, in turn, further enhance and improve the amount of sulfur removal by the process of the present invention. Lastly, the present process addresses the ecological need for a clean and efficient use of pyritic materials which will decrease the acid-drainage problems of Appalachian coal operations by consumption of waste pyrites and carbon-containing wastes.

Mined coal, also known as mineral coal, pit coal, hard coal and Steinkohle, generally contain sulfur and mineral detrites. A portion of this sulfur is usually present in the form of pyrite (iron disulfide). Pyrite has long posed a problem for those in the coal industry since removal of pyrite from coal is extremely difficult depending on the amount present. In many cases, combustion of high-sulfur coal is not permitted, while in other cases such combustion is permitted but expensive energy-consuming methods must be used to remove the sulfur-containing components from the exhaust gas stream before it is vented to the atmosphere. With some mineral coals, the problem is more pronounced than others. For example, in Ruhr Valley coal, some 40 to 60% by weight of the sulfur content of the mineral coal can be in the form of pyritic sulfur and pyrites themselves contain 50% and more sulfur by weight. The pyrite material that is used in the present process can therefore be intermixed with the coal or be added separately from another source of supply. In addition, chemical equivalents of pyrite may be used. It is therefore contemplated that iron and sulfur may be used as an equivalent to pyrite ($FeS_2$) when used in amounts approximately equal to the molar ratio of Fe and S in pyrite and achieve many of the benefits of the present invention.

Depending on the mix "recipe," the chemical and physical properties of the sintered solid material product by the present process will vary allowing a broad spectrum of use. While the amount of pyrite or its equivalent may vary, it is generally present in the mixture in amounts on a dry weight basis ranging from about 1 to about 20 percent by weight of the overall weight of the mixture Preferably, the mixture contains from about 5 to about 15 percent by weight of the pyritic material or its equivalent.

Both natural and by-product gypsums, such as those which originate from the production of phosphoric acid and which are commonly known as phosphogypsum, can be used. The particle size of the gypsum may range from about 20 mesh to 500 mesh and contain from 60 to 95% $CaSO_4$ in the form of crystals. While the amount of gypsum in the mixture can vary, the gypsum is generally present in amounts from about 50 to about 80 percent by weight of the overall mixture on a dry weight basis. Preferably, the gypsum is present in amounts ranging from about 55 to about 75 percent by weight of the mixture.

Since the pellets will be charged to a travelling grate for heating, it is preferred that the carbonaceous material be solid. Examples of carbonaceous materials that can be used include coke, petroleum coke and coal. Preferably, the coal has a high sulfur content which further contributes to the efficiency of the present process due to its lower cost and contribution to the overall production and removal of sulfur. While the weight percentage of the carbonaceous material, as carbon, to the overall weight of the total mixture may vary, the carbonaceous material as carbon is generally present in amounts ranging from about 3 to about 11 percent by weight of the total mixture on a dry basis. Preferably, the weight percent of the carbonaceous material as carbon is from about 4 to about 9 percent.

In addition to the carbonaceous material, gypsum and pyritic material, optional additives may be incorporated into the mixture. Examples of such additives include clay (phosphatic clays), recycled sintered material (also known as returns), and binding agents such as lime. The preferred additive is clay. The non-return additives may be present in amounts from 0 to 5 percent by weight of the mixture on a dry weight basis with amounts of from 1 to about 2 percent by weight being preferred. The recycled sintered material or return additives may be present in greater amounts ranging from about 5 to 25 percent by weight of the mixture on a dry weight basis with amounts of from 10 to about 20 percent by weight being preferred.

In accordance with the present invention, the present process utilizes a balling mechanism for forming a mixture of gypsum, carbonaceous material and pyritic material into pellets.

For proper balling, it is preferable that a portion of the mixture fed to the balling mechanism be relatively fine. The balling mechanism can be an open circuit balling pan or drum arrangement or a closed circuit balling pan or drum arrangement with sizing devices such as vibrating screens or roller separators. The balling mechanism is designed to produce balls or green pellets about 1 inch (25.4 mm) or less in diameter. One example of a suitable pelletized pan apparatus is illustrated in U.S. Pat. No. 3,169,269. Water and/or other ingredients may be added to the mixture being balled to aid in the forming of green pellets.

The travelling grate mechanism includes sealed hoods and burners for heating the pellets under controlled reaction conditions to evolve sulfur and/or sulfur dioxide. One example of a preferred travelling grate mechanism is a liquid sealed circular grate (Carousel type) similar to the circular travelling grates commercially available from Davy McKee Corporation, Lakeland, Fla. 33807, U.S.A., having sufficient size in order to economically handle large quantities of pellets Travelling grates useful in producing the present invention are also disclosed in U.S. Pat. Nos. 3,302,936; 3,325,395; 4,111,755; 4,200,517; and 4,220,454 which are incorporated by reference in their entirety.

Figure 2:
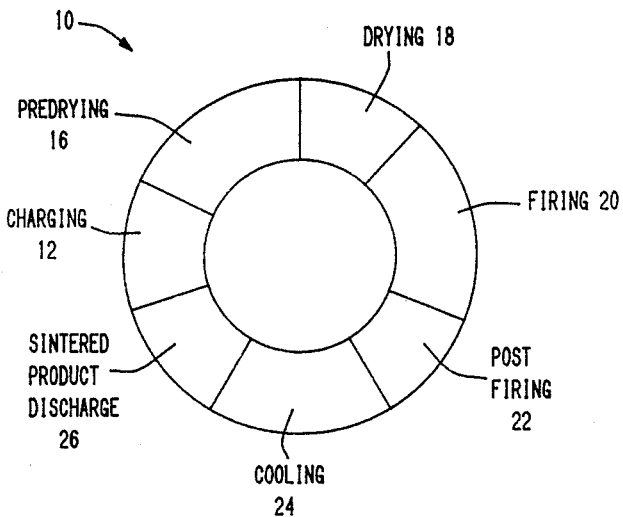
FIG. 2 is a diagramatic plan view of a circular travelling grate suitable for use in the present invention.

An example of a suitable circular travelling grate mechanism 10 is illustrated in FIGS. 1 and 2. The mechanism 10 includes facilities 12 for depositing a charge of green pellets upon a moving grate 14 which successively moves the charge through various zones, such as predrying zone 16, drying zone 18, firing zone 20, post-firing zone 22 and cooling zone 24, within a sealed hood to a facility 26 for discharging solids from the travelling grate. In the predrying zone 16 air from blower 28 which is heated in heat exchangers 30 and 32 by the product gas, is employed to remove at least a portion of the moisture from the green pellets. Blower 34 drives air through the hot charge on the grate 14 in the cooling zone 24 and thence to the drying zone 18 where the air completes the drying of the green pellets. The moist waste drying air is removed by blower 36 from a wind box 38 extending in the predrying and drying zones. A burner 40, supplies heated gas to the firing zone 20 sufficient to heat the surface of the charge to a temperature within the range of 1800° to 2200° F. (980° to 1200° C.) Quantities of fresh air from the blower 28 and recycled product gas from blower 42 are also supplied to the firing zone 20. The product gas is removed from the firing zone 20 via wind box 44 and is then passed through an incinerator 46 where combustible gas products are burned with fresh air from blower 28 and hot low BTU gas from burner 40. In post-firing zone 22, a portion of the product gas from blower 42 is recycled to pass upward through the charge and then downward into the product receiving wind box 44 to remove the greatest portion of product gas from the charge. The output product gas from the incinerator 46 is passed through a water heat boiler 48 and the heat exchangers 32 and 30 where heat from the process is recovered The effluent gas removed through heat exchanger 30 is passed to any conventional sulfuric acid plant. An example of a suitable plant is available from Davy McKee, Lakeland, Fla. 33807, U.S.A., which employs the Davy Double Absorption Catalytic process to convert sulfur dioxide to sulfuric acid.

A sintering pot system was utilized to simulate industrial conditions employing a travelling grate. The tests were used to compare the results of a thermal decomposition of a feed mix without pyrites (Example 1) and a feed mix incorporating pyrites (Example 2). Table 1 provides a summary of conditions and results for Example 1. Table 2 is a summary of the conditions and results for Example 2.

TABLE 1

CONDITIONS AND RESULTS FROM EXAMPLE 1 SINTERING TEST

| FEED DATA | | Wt % (Dry Basis) |
|---|---|---|
| Phosphogypsum (w/hydration water) | | 69 |
| Petroleum Coke | | 10 |
| Clay (Phosphatic Slimes) | | 1 |
| Returns | | 20 |
| | Total | 100 |
| CHARGE DATA | | |
| Moisture - Air Dried % | | 10.5 |
| Moisture - Oven Dried % | | 17.7 |
| Returns - lb | | 12.1 |
| Total Weight - lb (Fresh Feed & Returns) | | 69 |
| Size | | ¾" × ⅛" |
| + 6M % | | 94 |
| Bed Depth - in. | | 12 |
| Total Sulfur % (dry) | | 12.4 |
| PROCESSING CONDITIONS | | |
| Drying Duration - min. | | 0 |
| Ignition Duration - min. | | 1.25 |
| Sintering: | | |
| Average Bed ΔP - in. $H_2O$ | | 7.5 |
| Peak Bed Temp. - °F. | | 2800+ |
| Wind Box Temp. - °F. | | 400 max. |
| Sintering Duration - min. | | 12 |
| Cooling Duration ($SO_2$ < 1%) | | 1.75 |
| Total Duration - min. | | 14.5 |
| PRODUCT DATA-GAS | | |
| Max. $SO_2$ Content - Vol. % | | 7.6 |
| Time $SO_2$ over 5 vol. % (Dry) - min. | | 9 |
| Levelized $SO_2$ ($SO_2/O_2$ = 1) - Vol. % (Dry) | | 6.1 |
| PRODUCT DATA-SOLIDS | | |
| Discharge Weight - lb | | 38.4 |
| Hearth Layer Free Weight - lb | | 34.4 |
| Sulfur - Fresh Feed - lb | | 6.14 |
| Sulfur - Net Product - lb | | 1.02 |
| Sulfur Removal - % | | 83.4 |
| Los Angeles Abrasion Test - weight percent greater than | | 43% |

TABLE 2

CONDITIONS AND RESULTS FROM EXAMPLE 2

| FEED DATA | WT % (Dry Basis) |
|---|---|
| Phosphogypsum (w/hydration water) | 56 |
| Petroleum Coke | 5 |
| Pyrites | 18 |
| Clay (Phosphatic Slimes) | 1 |
| Returns | 20 |
| Total | 100 |
| CHARGE DATA | |
| Moisture - Air Dried % | 10.7 |
| Moisture - Oven Dried % | 17.9 |
| Returns - lb | 19.0 |
| Total Weight - lb (Fresh Feed & Returns) | 86 |
| Size | ¾" × ⅛" |
| + 6M % | 92 |
| Bed Depth - in. | 12 |
| Total Sulfur % (dry) | 16.2 |
| PROCESSING CONDITIONS | |
| Drying Duration - min. | 0 |
| Ignition Duration - min. | .75 |
| Sintering: | |
| Average Bed ΔP - in. $H_2O$ | 9.0 |
| Peak Bed Temp. - °F. | 2600 + |
| Wind Box Temp. - °F. | 500 max. |
| Sintering Duration - min. | 17.75 |
| Cooling Duration ($SO_2$ <1%) | 1.5 |
| Total Duration - min. | 20.0 |
| PRODUCT DATA-GAS | |
| Max. $SO_2$ Content - Vol. % | 16.2 |
| Time $SO_2$ over 5 vol. % (Dry) - min. | 15 |
| Levelized $SO_2$ ($SO_2/O_2$ = 1)-Vol. % (Dry) | 9.0 |
| PRODUCT DATA-SOLIDS | |
| Discharge Weight - lb | 50.25 |
| Hearth Layer Free Weight - lb | 44.25 |
| Sulfur - Fresh Feed - lb | 9.95 |
| Sulfur - Net Product - lb | .78 |
| Sulfur Removal - % | 92.2 |
| Los Angeles Abrasion Test - weight percent greater than | 68% |

Amongst the significant improvements in the data of Table 2 over that of Table 1 is a substantial increase of 58% in the Los Angeles Abrasion Test of the sintered material of the present invention over the lime product of Table 1.

Since one of the critical parameters for the successful production of sulfuric acid is the $SO_2$ strength in the fuel gas, the $SO_2$ concentration was continually measured in Examples 1 and 2. The $SO_2$ concentration was measured using a Teledyne Model 690 $SO_2$ analyzer. Plots of $SO_2$ concentration versus time for Examples 1 and 2 are given in FIG. 3.

As can be seen in FIG. 3, the addition of pyrites results in a dramatic increase in the $SO_2$ strength. The longer sintering time is more than offset by the increased density of the material processed and lower amounts of raw materials fed per ton of $H_2SO_4$.

While the present invention has been described with reference to particular embodiments thereof, it will be understood that numerous modifications may be made by those skilled in the art without actually departing from the spirit and scope of the invention as defined in the appended claims.

We claim:

1. In a process of desulfurization of gypsum comprising the steps of:
    (a) forming a mixture of carbonaceous material and gypsum,
    (b) balling the mixture to form pellets,
    (c) charging the pellets to a travelling grate,
    (d) moving the travelling grate to carry the charge of pellets successively through a firing and post firing zones,
    (e) heating the charge on the grate in the firing zone to produce a solid sintered material and a gaseous effluent containing sulfur dioxide, sulfur or mixtures thereof, and
    (f) passing a portion of the gaseous effluent from the firing zone through the charge in the post firing zone, the improvement comprising adding a pyritic material or its equivalent amount of Fe and S to the mixture of carbonaceous material and gypsum wherein the total amount of the carbonaceous material and the pyritic material is greater than 9 percent by weight of the mixture.

2. The process of claim 1 wherein the mixture comprises, on a dry weight basis (a) from about 50 to about 80 percent by weight of gypsum;
(b) from about 3 to about 11 percent by weight of carbonaceous material as carbon; and
(c) from about 1 to about 20 percent by weight of pyritic material or its equivalent.

3. The process of claim 2 wherein the carbonaceous material is coke, petroleum coke or coal.

4. The process of claim 3 wherein the carbonaceous material is petroleum coke.

5. The process of claim 3 wherein the carbonaceous material is coal containing a substantial portion of sulfur.

6. The process of claim 1 wherein the mixture additionally contains clay, lime, or mixture thereof.

7. The process of claim 1 wherein the portion of gaseous effluent that passes through the charge in the post firing zone is combined with the gaseous effluent from the firing zone, and the portion of the gaseous effluent being passed through the charge in the post firing zone is taken from the combined effluent.

8. The process of claim 1 wherein said solid sintered material is discharged from the grate and is recycled by addition to said mixture of carbonaceous material and gypsum.

9. The process of claim 8 wherein the mixture additionally contains clay, lime, or mixtures thereof.

10. The process of claim 1 wherein the mixture comprises on a dry weight basis,
(a) from about 55 to about 75 percent by weight of gypsum;
(b) from about 4 to about 9 percent by weight of carbonaceous material as carbon;
(c) from about 5 to about 15 percent by weight of pyritic material or its equivalent in terms of Fe
(d) from about 0 to about 5 percent by weight of clay, lime or mixtures thereof; and
(e) from about 5 to about 25 percent by weight of recycled solid sintered material;

11. The process of claim 8 wherein the clay, lime or mixtures thereof is present in amounts of from about 1 to percent by weight.

12. The process of claim 8 wherein the recycled sintered material is present in amounts of from about 10 to 20 percent by weight.

* * * * *

UNITED STATES PATENT AND TRADEMARK OFFICE
CERTIFICATE OF CORRECTION

PATENT NO. : 4,946,658

DATED : August 7, 1990

INVENTOR(S) : Jerome H. Marten et al.

It is certified that error appears in the above-identified patent and that said Letters Patent is hereby corrected as shown below:

Column 3, line 22, after "mixture" insert --.--.

Column 4, line 23, after "pellets" insert --.--;

line 62, after "recovered" insert --.--.

Column 8, line 12, after "Fe" insert --and S;--;

line 19, after "to" insert --2--.

Signed and Sealed this

Fourth Day of February, 1992

Attest:

HARRY F. MANBECK, JR.

*Attesting Officer*  *Commissioner of Patents and Trademarks*